United States Patent Office 2,732,281
Patented Jan. 24, 1956

2,732,281

DISPROPORTIONATION OF CHLOROSILANES EMPLOYING METALLIC-HALIDE-TREATED CYANAMIDES AS CATALYSTS

Donald L. Bailey, Snyder, and George H. Wagner, Clarence, N. Y., assignors to Union Carbide and Carbon Corporation, a corporation of New York No Drawing. Application March 25, 1953,
Serial No. 344,682

21 Claims. (Cl. 23—14)

This invention relates to those compounds normally termed chlorosilanes and, more particularly, to the production of such compounds by a new and improved process.

The widely known methods for the production of chlorosilanes yield, in general, a trichlorosilane as the principal product. In such methods, however, there is also obtained minor proportions of other compounds, including monochloro- and dichlorosilanes. The latter compounds have been found particularly useful in numerous syntheses, and therefore considerable attention has been directed toward their production. Heretofore, efforts to obtain such compounds have been for the most part directed toward either modifying the well-known reactions which yield a trichlorosilane or by reacting a trichlorosilane with other compounds whereby one or more chlorine atoms are removed. Production of monochloro- and dichlorosilanes by either of the above methods has not proven entirely satisfactory and, consequently, the need for an improved method exists.

In its broadest aspects, the invention permits, in an assemblage of chlorosilane molecules, a redistribution of particular atoms connected to silicon. Such redistribution may be termed a disproportionation of the molecule whereby a rearrangement of the atoms is accomplished. It has been found that the method of our invention affects disproportionation of only those chlorosilane molecules containing at least one hydrogen to silicon bond. In each instance where disproportionation occurs, the redistribution affects only those hydrogen and chlorine atoms which are bonded to a silicon atom. For example, trichlorosilane, $HSiCl_3$, may be disproportionated whereby a rearrangement of hydrogen and chlorine atoms occurs to yield dichlorosilane, $H_2SiCl_2$, and silicon tetrachloride, $SiCl_4$. Dichlorosilane, $H_2SiCl_2$, may also be disproportionated and yields monochlorosilane, $H_3SiCl$, and trichlorosilane, $HSiCl_3$. In a like manner under the teachings of our invention, the substituted chlorosilanes may be disproportionated so long as such molecules contain at least one hydrogen atom bonded to silicon. For example, an alkyl dichlorosilane disproportionates to the alkyl trichlorosilane and the alkyl monochlorosilane. The redistribtuion of atoms which occurs when disproportionating a substituted chlorosilane is limited solely to a rearrangement of those hydrogen and chlorine atoms attached to silicon. The substituent group or groups attached to the silicon atom of a chlorosilane are not affected by the process of our invention.

Disproportionation is effected in accordance with the present invention by treating the chlorosilanes with a catalyst at temperatures preferably below 150° C. and generally between 20° C. and 60° C. If temperatures above 150° C. are employed, difficulty occasionally arises as it has been found that our catalysts oftentimes decompose and lose their catalytic activity. The catalyst employed comprises the metal halide-treated aliphatic cyanamides. In the practice of our invention, the amount of catalyst employed is not critical and, therefore, from about 1% to about 15% by weight of the chlorosilane may be used. The preferred range, however, varies from about 2% to about 10% by weight.

The redistribution effected by the disproportionation of chlorosilanes conducted in accordance with hte present invention may be represented by the following equation:

$$2RSiHCl_2 \underset{heat}{\overset{catalyst}{\rightleftarrows}} RSiH_2Cl + RSiCl_3$$

wherein R may be alkyl, aryl, chlorine or hydrogen. Representative examples of the effected rearrangement are depicted by the following equations wherein trichlorosilane, dichlorosilane, monochlorosilane, methyldichlorosilane, ethyldichlorosilane, vinyldichlorosilane, and phenyldichlorosilane are disproportionated:

$$2HSiCl_3 \rightleftarrows H_2SiCl_2 + SiCl_4$$
$$2H_2SiCl_2 \rightleftarrows H_3SiCl + HSiCl_3$$
$$2H_3SiCl \rightleftarrows SiH_4 + H_2SiCl_2$$
$$2CH_3SiHCl_2 \rightleftarrows CH_3SiH_2Cl + CH_3SiCl_3$$
$$2C_2H_5SiHCl_2 \rightleftarrows C_2H_5SiH_2Cl + C_2H_5SiCl_3$$
$$2CH_2=CHSiHCl_2 \rightleftarrows CH_2=CHSiH_2Cl + CH_2=CHSiCl_3$$
$$2C_6H_5SiHCl_2 \rightleftarrows C_6H_5SiH_2Cl + C_6H_5SiCl_3$$

Thus, the general effect of the disproportionation of a given chlorosilane is to form two different chlorosilanes, one of which contains more chlorine atoms and fewer hydrogen atoms bonded to silicon than the starting material and the other of which contains fewer chlorine atoms and more hydrogen atoms bonded to silicon than the starting chlorosilane.

The process of our invention may be conducted by any suitable method, preferably while maintaining the temperature below 150° C. For example, the chlorosilane catalyst may be placed in an autoclave and heated or vapors of the chlorosilane may be passed over a bed of the catalyst. It is also possible to conduct the reaction at atmospheric pressure whenever the boiling point of the starting chlorosilane is below the temperature normally employed in such disproportionations.

As is evident from the above equations, the disproportionation reactions are in chemical equilibria and, therefore, the products of such reactions are present in the reaction mixture in amounts determined by the equilibrium constants for the reactions. We have found that it is possible to obtain yields in excess of the equilibrium amounts by employing a method which permits the removal from the reaction mixture of one of the products as it is prepared. By so doing, the reaction will proceed toward completion.

The preferred method for carrying out the process of the invention makes use of the fact that the chlorosilanes are disproportionated at temperatures below their boiling points. Therefore, by conducting the reaction in a flask connected to a fractionating column and heating to the boiling temperature of the mixture, the lower boiling chlorosilanes prepared by the disproportionation will distill, thus causing the reaction to proceed toward completion with increased yields.

Care should be taken when employing the preferred method of our invention to determine whether the boiling temperatures at atmospheric pressure are in excess of 150° C. If they should be greater than or in the vicinity of 150° C. as is the case when some of the aryl chlorosilanes are employed, it is desirable that the reaction be conducted under reduced pressure, thereby permitting lower disproportionating and boiling temperatures.

Of course, it may not always be convenient to effect disproportionation of chlorosilane by the preferred method. For example, whenever the chlorosilane is gaseous at room temperature and at atmospheric pressure, it will be desirable to employ an autoclave or to pass the gas over the bed of the catalyst.

As hereinbefore indicated, the catalysts of our invention broadly comprise the metallic-halide-treated cyanamides. The preferred metal halides which may be employed to prepare the catalysts are those of the Friedel-Crafts type, and include the fluorides and chlorides of boron, titanium, aluminum, zinc, tin and iron. The aliphatic cyanamides which we prefer to employ are the dialkyl and dialkenyl cyanamides, such as dimethyl, diethyl, diisopropyl, and diallyl cyanamides. Generally, the amount of metal halide employed to treat the aliphatic cyanamide varies from about 2% to about 30% by weight of the cyanamide.

The catalyst may be prepared by any convenient method. For example, in those instances where the metal halide is gaseous, the catalyst may be prepared by passing the halide into a vessel containing the dialkyl cyanamide. We have noted that the cyanamide readily absorbs the metal halide gas and that the mixture is easily removed from the vessel to the reaction flask. It is also possible to add the gaseous metal halide to the reaction flask containing the chlorosilane and dialkyl cyanamide. Whenever the halide is in granular or powder form it may be added to the cyanamide either before, after, or simultaneously with the chlorosilane.

In the table below there appears a tabulated report of a number of trichlorosilane disproportionations conducted at atmospheric pressure and at reflux temperatures in a flask connected to a fractionating column. As trichlorosilane yields a gaseous product, namely, dichlorosilane, which distills below room temperature at atmospheric pressure, a special type of fractionating column was employed. This column was equipped with a Dry Ice cold finger and a vacuum jacket. The products obtained were identified by further distillation, infrared measurements, determination of densities, refractive indices, molecular weights (gas density methods), and analysis for hydrolyzable hydrogen and chlorine. The catalyst employed in each reaction consisted of dimethyl cyanamide treated with a metal halide of the Friedel-Crafts type.

TABLE I

*Disproportionation of trichlorosilane*

| Starting Compound Trichlorosilane (grams) | Catalyst | | Time (hr.) | Product Composition (Mole Percent) $H_2SiCl_2$ |
|---|---|---|---|---|
| | Dimethyl Cyanamide (grams) | Metal Halide | | |
| 114 | 11 | None | 6 | 7 |
| 89.5 | 5 | $BF_3$ | 3 | 55 |
| 100 | 5 | 1.0 g. $TiCl_4$ | 4 | 59 |
| 105.8 | 5 | 0.5 g. $AlCl_3$ | 4 | 51 |
| 100 | 5 | 1.1 g. $SnCl_4$ | 3 | 51 |
| 98.5 | 5 | 0.7 g. $FeCl_3$ | 4.3 | 56 |

As may be seen from the above table, dimethyl cyanamide when treated with a metal halide is substantially more effective as a disproportionating catalyst than untreated dimethyl cyanamide.

To illustrate that other aliphatic cyanamides treated with metal halides are effective in disproportionations, we conducted a number of reactions wherein diallyl and diisopropyl cyanamide were treated with boron chloride and employed as catalysts. The table below contains the data relating to such reactions. In each instance, boron fluoride was passed into the cyanamide at room temperature. These reactions were conducted in a closed vessel to ilustrate that methodls other than the preferred method may be employed to carry out the process of our invention. As the reactions are in equilibrium and as none of the products were removed from the reaction mixture, we obtained only equilibrium amounts.

TABLE II

*Disproportionation of trichlorosilane*

| Starting Compound (Trichlorosilane (grams) | Catalyst | Product Composition (Mole Percent) $H_2SiCl_2$ |
|---|---|---|
| 50 | 2.5 g. diallyl cyanamide treated with $BF_3$ | 7.2 |
| 50 | 2.5 g. diisopropyl cyanamide treated with $BF_3$ | 6.3 |
| 100 | 0.5 g. dimethyl cyanamide treated with $BF_3$ | 9.2 |

Disproportionation of the hydrocarbon substituted chlorosilanes is also within the scope of our invention. Such disproportionation is effected in the same manner as reported above in the disproportionation of trichlorosilane. The following table discloses the results of reactions with hydrocarbon substituted chlorosilanes which were conducted at atmospheric pressure and at reflux temperatures.

TABLE III

*Disproportionation of hydrocarbon-substituted chlorosilanes*

| Compound | Catalyst | Product |
|---|---|---|
| 108 g. methyldichlorosilane $CH_3SiHCl_2$. | 5 g. dimethyl cyanamide treated with 0.5 g. $FeCl_3$. | 20 g. methylmonochlorosilane, $CH_3SiH_2Cl$. |
| 169.7 g. vinyldichlorosilane. | 9 g. dimethyl cyanamide treated with $BF_3$ gas. | 22.8 g. vinylmonochlorosilane, $CH_2=CHSiH_2Cl$. |

The above examples disclose the disproportionation of various chlorosilanes, and it is to be understood that the present invention is not limited to the specific examples disclosed, but instead that it is applicable to the disproportionation of aliphatic and aromatic chlorosilanes containing at least one hydrogen atom bonded to the silicon atom. Furthermore, it is to be understood that aliphatic cyanamides treated with any metal halide of the Friedel-Crafts type may be employed as disproportionating catalysts, the examples disclosed serving only as representative compounds.

We claim:

1. A process of disproportionating a chlorosilane containing at least one hydrogen atom bonded to silicon which comprises treating said silane with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

2. A process of disproportionating a chlorosilane containing at least one hydrogen atom bonded to silicon which comprises treating said silane with a catalyst comprising a dialkyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

3. A process of disproportionating a chlorosilane containing at least one hydrogen atom bonded to silicon which comprises treating said silane with a catalyst comprising a dialkyl cyanamide treated with boron fluoride and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

4. A process of disproportionating a chlorosilane containing at least one hydrogen atom bonded to silicon which comprises treating said silane with a catalyst comprising a dialkyl cyanamide treated with aluminum chloride and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

5. A process of disproportionating a chlorosilane containing at least one hydrogen atom bonded to silicon which comprises treating said silane with a catalyst comprising a dialkyl cyanamide treated with tin chloride and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

6. A process of disproportionating a chlorosilane containing at least one hydrogen atom bonded to silicon which comprises treating said silane with a catalyst comprising a dialkyl cyanamide treated with titanium chloride and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

7. A process of disproportionating a chlorosilane containing at least on hydrogen atom bonded to silicon which comprises treating said silane with a catalyst comprising a dialkyl cyanamide treated with iron chloride and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

8. A process of disproportionating a chlorosilane containing at least one hydrogen atom bonded to silicon which comprises treating said silane with a catalyst comprising dimethyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

9. A process of disproportionating a chlorosilane containing only hydrogen and chlorine atoms bonded to silicon which comprises treating said silane with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

10. A process of disproportionating a hydrocarbyl substituted chlorosilane containing at least one hydrogen atom bonded to silicon which comprises treating said silane with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

11. A process of disproportionating an alkyl chlorosilane containing at least one hydrogen atom bonded to silicon which comprises treating said silane with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

12. A process of disproportionating an alkenyl chlorosilane containing at least one hydrogen atom bonded to silicon which comprises treating said silane with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

13. A process of disproportionating trichlorosilane which comprises treating said silane with a catalyst consisting of dimethyl cyanamide treated with boron fluoride and recovering dichlorosilane and silicon tetrachloride.

14. A process of disproportionating trichlorosilane which comprises treating said silane with a catalyst consisting of dimethyl cyanamide treated with titanium chloride and recovering dichlorosilane and silicon tetrachloride.

15. A process of disproportionating trichlorosilane which comprises treating said silane with a catalyst consisting of dimethyl cyanamide treated with aluminum chloride and recovering dichlorosilane and silicon tetrachloride.

16. A process of disproportionating trichlorosilane which comprises treating said silane with a catalyst consisting of dimethyl cyanamide treated with iron chloride and recovering dichlorosilane and silicon tetrachloride.

17. A process of disproportionating vinyldichlorosilane which comprises treating said silane with a catalyst consisting of dimethyl cyanamide treated with boron trifluoride and recovering vinylmonochlorosilane and vinyltrichlorosilane.

18. A process of disproportionating a chlorosilane containing at least one hydrogen atom bonded to silicon which comprises treating said silane at temperatures below 150° C. with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

19. A process of disproportionating a chlorosilane containing at least one hydrogen atom bonded to silicon which comprises treating said silane at a temperature of from about 20° C. to about 60° C. with a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

20. A process of disproportionating a chlorosilane containing at least one hydrogen atom bonded to silicon which comprises treating said silane with from about 1 per cent to about 15 per cent by weight of the chlorosilane of a catalyst comprising an aliphatic hydrocarbyl cyanamide treated with a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

21. A process of disproportionating a chlorosilane containing at least one hydrogen atom bonded to silicon which comprises treating said silane at temperatures below 150° C. with a catalyst comprising an aliphatic hydrocarbyl cyanamide treated with from about 2 per cent to about 30 per cent by weight of the hydrocarbyl cyanamide of a Friedel-Crafts catalyst and recovering two different silane compounds, one of which contains more hydrogen atoms and fewer chlorine atoms attached to silicon than the starting chlorosilane, and the other of which contains more chlorine atoms and fewer hydrogen atoms attached to silicon than the starting chlorosilane.

References Cited in the file of this patent

FOREIGN PATENTS 663,810  Great Britain _____ Dec. 27, 1951

OTHER REFERENCES

Sauer et al.: Jour. Am. Chem. Soc., vol. 70 (1948), pages 3590–3596.